(12) United States Patent
Oku (10) Patent No.: US 10,312,529 B2
(45) Date of Patent: Jun. 4, 2019

(54) FUEL CELL STACK

(71) Applicant: NISSAN MOTOR CO., LTD., Yokohama-shi, Kanagawa (JP)

(72) Inventor: Takanori Oku, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/766,101

(22) PCT Filed: Oct. 6, 2015

(86) PCT No.: PCT/JP2015/078300
§ 371 (c)(1),
(2) Date: Apr. 5, 2018

(87) PCT Pub. No.: WO2017/060972
PCT Pub. Date: Apr. 13, 2017

(65) Prior Publication Data
US 2018/0287170 A1    Oct. 4, 2018

(51) Int. Cl.
*H01M 8/0297* (2016.01)
*H01M 8/24* (2016.01)
*H01M 8/02* (2016.01)
*H01M 8/0258* (2016.01)
*H01M 8/1004* (2016.01)
*H01M 8/0202* (2016.01)
(Continued)

(52) U.S. Cl.
CPC ........... *H01M 8/0297* (2013.01); *H01M 8/02* (2013.01); *H01M 8/0258* (2013.01); *H01M 8/1004* (2013.01); *H01M 8/24* (2013.01); *H01M 8/0202* (2013.01); *H01M 8/0206* (2013.01); *H01M 8/242* (2013.01)

(58) Field of Classification Search
CPC .... H01M 8/02; H01M 8/0202; H01M 8/0206; H01M 8/1004; H01M 8/24; H01M 8/242; H01M 8/0297; H01M 8/0258
USPC .......................................................... 429/457
See application file for complete search history.

(56) References Cited

U.S. PATENT DOCUMENTS

2008/0134496 A1    6/2008   Bae
2009/0014497 A1    1/2009   Ryu
(Continued)

FOREIGN PATENT DOCUMENTS

CN      101342635 A      1/2009
JP      2006-114444 A    4/2006
(Continued)

*Primary Examiner* — Jonathan G Jelsma
*Assistant Examiner* — Omar M Kekia
(74) *Attorney, Agent, or Firm* — Foley & Lardner LLP (57) ABSTRACT

A fuel cell stack is constituted by stacking fuel cells including a membrane electrode assembly constituted by sandwiching an electrolyte membrane with a pair of electrodes and a pair of separators that have flow passages through which gas to be supplied to the membrane electrode assembly flows, the pair of separators being arranged across the membrane electrode assembly. The fuel cell stack includes a welded portion where the separators adjacent to one another in a stacking direction of the fuel cell are welded. The separator in the stacking direction at the welded portion has a height lower than a height of the separator other than the welded portion.

10 Claims, 9 Drawing Sheets

(51) Int. Cl.
    *H01M 8/0206*   (2016.01)
    *H01M 8/242*    (2016.01)

(56) References Cited

U.S. PATENT DOCUMENTS

| | | | |
|---|---|---|---|
| 2009/0053571 A1* | 2/2009 | Takata | H01M 8/0206 |
| | | | 429/434 |
| 2009/0092872 A1 | 4/2009 | Miyazawa et al. | |
| 2014/0162164 A1* | 6/2014 | Jin | H01M 8/0206 |
| | | | 429/463 |
| 2014/0199608 A1 | 7/2014 | Vincent et al. | |
| 2015/0228998 A1 | 8/2015 | Vincent et al. | |

FOREIGN PATENT DOCUMENTS

| | | |
|---|---|---|
| JP | 2007-311069 A | 11/2007 |
| JP | 2009-043604 A | 2/2009 |
| JP | 2015-022802 A | 2/2015 |
| JP | 2015-526870 A | 9/2015 |

\* cited by examiner

FUEL CELL STACK

TECHNICAL FIELD

The present invention relates to a fuel cell stack constituted by sticking fuel cells having a separator.

BACKGROUND ART

JP2015-22802A discloses that, in fuel cells that are adjacent, an anode separator of one fuel cell is welded to a cathode separator of the other fuel cell to join both separators. The separator includes a plurality of fluid flow passages formed such that a bottom portion that abuts on a membrane electrode assembly, and a protrusion that protrudes from this bottom portion are repeatedly arranged. The adjacent two separators are joined such that the protrusions are welded to one another.

SUMMARY OF INVENTION

Such joining of the separators is performed for preventing positional deviation or the like of the separators when a fuel cell stack is manufactured. Therefore, all the protrusions of the separators are not welded, and some protrusions among the plurality of existing protrusions will be selected as separator welding positions.

When the separators are welded using only several protrusions, in stacking of a plurality of fuel cells, a protrusion height of the protrusion at a welding position will be higher than a protrusion height of another protrusion caused by a thickness of a welding bead. Thus, if a part of the fluid flow passage of the separator is higher than another part, in constituting of the fuel cell stack, a contact surface pressure that acts on the separator varies. Then, the separator cannot contact the membrane electrode assembly uniformly within a contact surface, thus increasing contact resistance inside the fuel cell stack. The high part in the separator will be strongly pressed to the membrane electrode assembly, thus having a concern that the membrane electrode assembly deteriorates.

An object of the present invention is to provide a fuel cell stack configured to reduce variation of a contact surface pressure of a separator and a membrane electrode assembly.

According to an aspect of this invention, a fuel cell stack constituted by stacking fuel cells including a membrane electrode assembly constituted by sandwiching an electrolyte membrane with a pair of electrodes and a pair of separators that have flow passages through which gas to be supplied to the membrane electrode assembly flows, the pair of separators being arranged across the membrane electrode assembly, is provided. The fuel cell stack includes a welded portion where the separators adjacent to one another in a stacking direction of the fuel cell are welded. The separator in the stacking direction at the welded portion has a height lower than a height of the separator other than the welded portion.

DESCRIPTION OF EMBODIMENTS

The following describes embodiments of the present invention with reference to the drawings and the like.

First Embodiment

A fuel cell is constituted such that an anode electrode as a fuel electrode and a cathode electrode as an oxidant electrode sandwich an electrolyte membrane. The fuel cell generates electric power using anode gas containing hydrogen supplied to the anode electrode and cathode gas containing oxygen supplied to the cathode electrode. Electrode reaction that progresses in both electrodes: the anode electrode and the cathode electrode is as follows.

$$\text{Anode electrode: } 2H_2 \rightarrow 4H^+ + 4e^- \tag{1}$$

$$\text{Cathode electrode: } 4H^+ + 4e^- + O_2 \rightarrow 2H_2O \tag{2}$$

With these electrode reactions (1) and (2), the fuel cell generates an electromotive force with about 1 V (volt).

Figure 1:
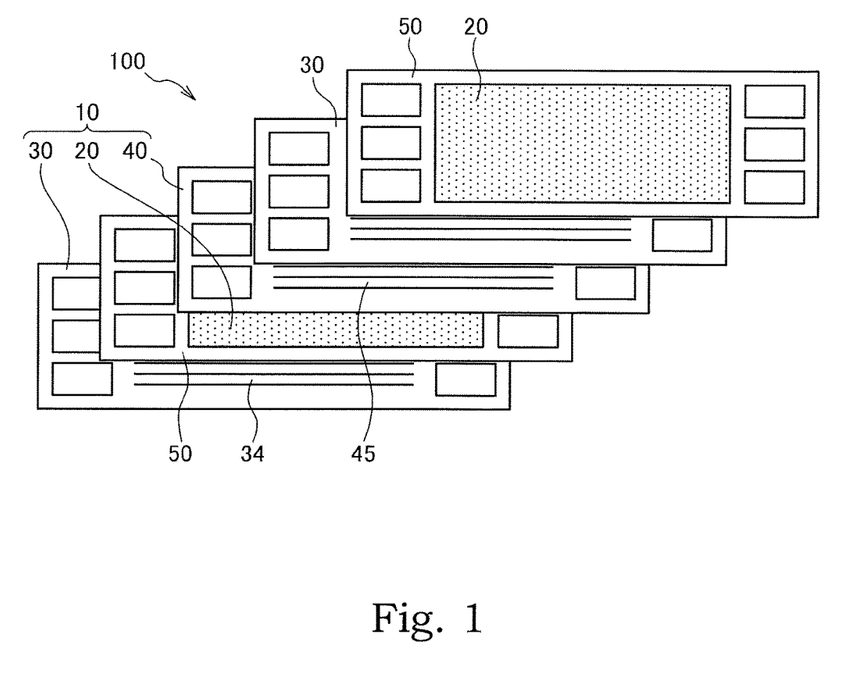
FIG. 1 is a schematic configuration diagram of a fuel cell stack according to a first embodiment of the present invention.

FIG. 1 is an exploded view illustrating a schematic configuration of a fuel cell stack 100 according to a first embodiment.

The fuel cell stack 100 illustrated in FIG. 1 is a fuel cell stack used for a vehicle such as an electric vehicle and a hybrid vehicle. However, the fuel cell stack 100 may be used as a power source of various electrical devices, not limited to the use in the automobile and the like.

The fuel cell stack 100 is a stacked battery constituted such that a plurality of fuel cells 10 as unit cells are stacked.

The fuel cell 10 that constitutes the fuel cell stack 100 includes a membrane electrode assembly (MEA) 20, an anode separator 30 arranged at one surface of the MEA 20, and a cathode separator 40 arranged at the other surface of the MEA 20. Thus, in the fuel cell stack 100, a pair of separators 30, 40 are arranged across the MEA 20.

Figure 2:
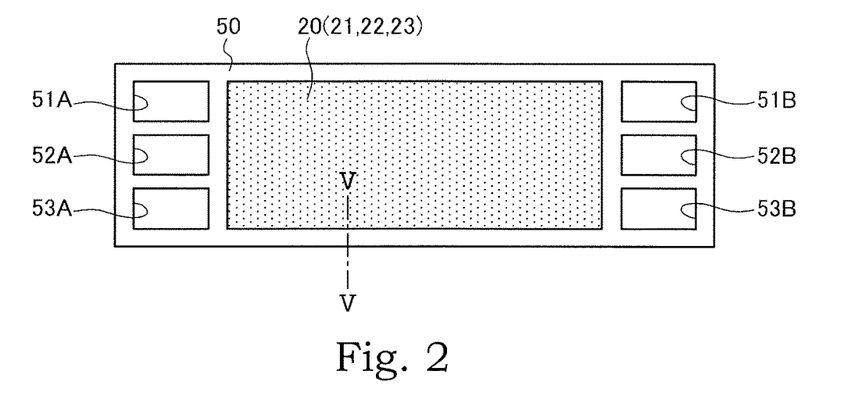
FIG. 2 is a front view of a membrane electrode assembly that constitutes a fuel cell.
Figure 3:
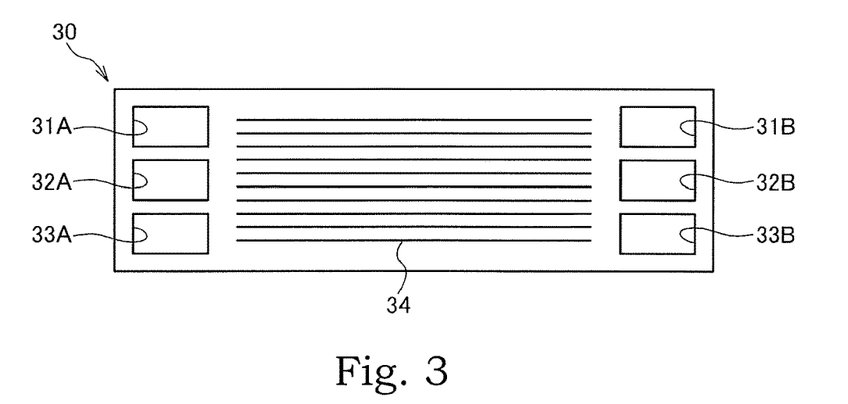
FIG. 3 is a front view of an anode separator that constitutes the fuel cell.

As illustrated in FIG. 2 and FIG. 3, the MEA 20 is constituted of an electrolyte membrane 21, an anode electrode 22 arranged at one surface of the electrolyte membrane 21, and a cathode electrode 23 arranged at the other surface of the electrolyte membrane 21. It should be noted that FIG. 2 illustrates a front view of the MEA 20 that constitutes the fuel cell 10, and FIG. 5 illustrates a partial vertical cross-sectional view of the fuel cell 10 at a position V-V in FIG. 2.

Figure 5:
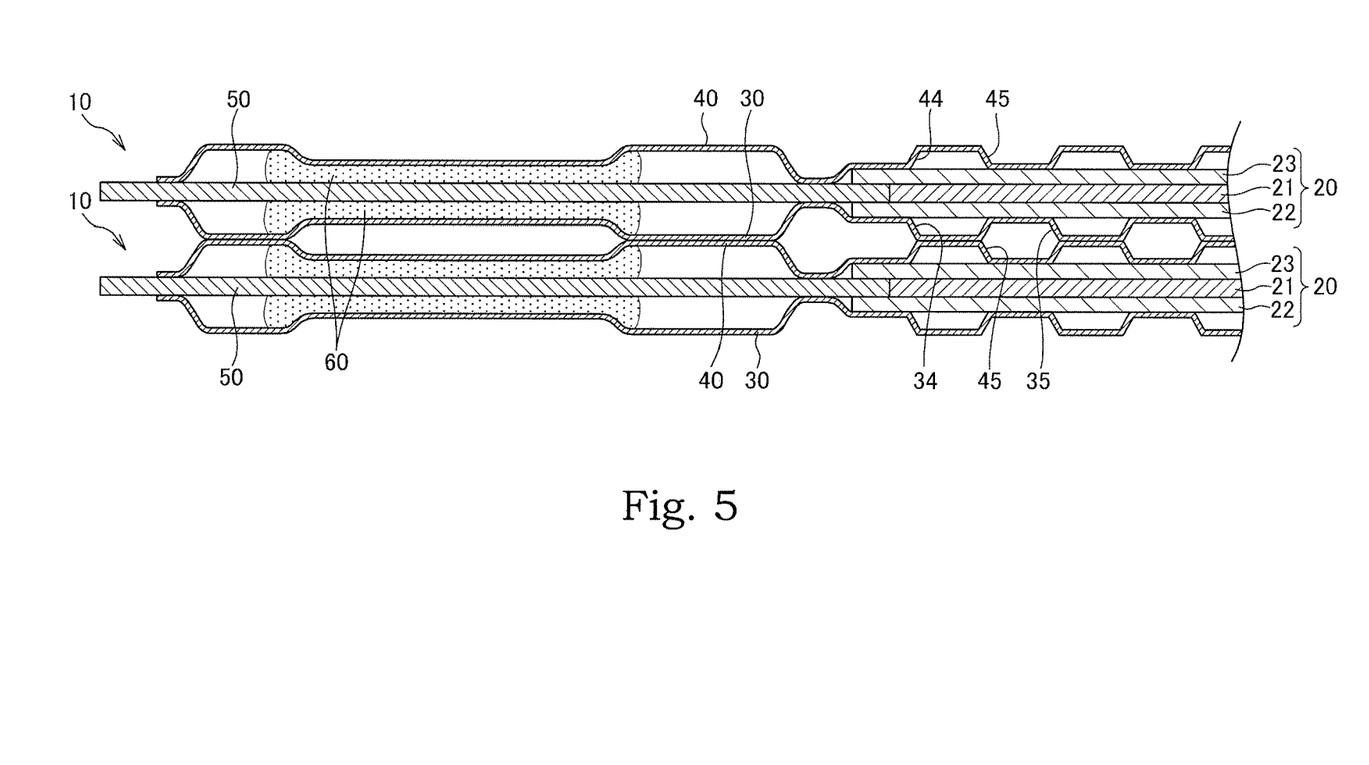
FIG. 5 is a partial vertical cross-sectional view of the fuel cell stack.

As illustrated in FIG. 5, the electrolyte membrane 21 is a proton-conductive ion exchange membrane formed of fluorine-based resin. The anode electrode 22 is constituted such that, in an order from a side of the electrolyte membrane 21, an electrode catalyst layer made of an alloy such as platinum, a water-repellent layer made of fluorine resin or the like, and a gas diffusion layer made of a carbon cloth or the like are arranged. The cathode electrode 23, similarly to the anode electrode 22, is constituted such that, in an order from the electrolyte membrane 21 side, the electrode catalyst layer, the water-repellent layer, and the gas diffusion layer are arranged.

On the MEA 20, a frame portion 50 made of resin is disposed along an assembly outer periphery. The frame portion 50 is a frame body made of a synthetic resin or the like, and integrally formed on the MEA 20. The frame portion 50 may be constituted as a plate-shaped material having rigidity, or may be constituted as a sheet-shaped member having flexibility.

As illustrated in FIG. 2, at one end side (a left side in FIG. 2) of the frame portion 50, in an order from above, an anode gas supply manifold 51A, a cooling water supply manifold 52A, and a cathode gas supply manifold 53A are formed. At the other end side (a right side in FIG. 2) of the frame portion 50, in an order from above, an anode gas exhaust manifold 51B, a cooling water exhaust manifold 52B, and a cathode gas exhaust manifold 53B are formed.

As illustrated in FIG. 3 and FIG. 5, the anode separator 30 is a plate-shaped material formed of a conductive material such as metal. The anode separator 30 has an anode gas flow passage 34 that flows the anode gas on a surface at an MEA side, and has a cooling water flow passage 35 that flows cooling water on an opposite side surface of the MEA side.

As illustrated in FIG. 3, at one end side (a left side in FIG. 3) of the anode separator 30, in an order from above, an anode gas supply manifold 31A, a cooling water supply manifold 32A, and a cathode gas supply manifold 33A are formed. At the other end side (a right side in FIG. 3) of the anode separator 30, in an order from above, an anode gas exhaust manifold 31B, a cooling water exhaust manifold 32B, and a cathode gas exhaust manifold 33B are formed.

The anode gas supplied from the anode gas supply manifold 31A passes through the anode gas flow passage 34 to flow out to the anode gas exhaust manifold 31B. The cooling water supplied from the cooling water supply manifold 32A passes through the cooling water flow passage 35 to flow out to the cooling water exhaust manifold 32B.

Figure 4:
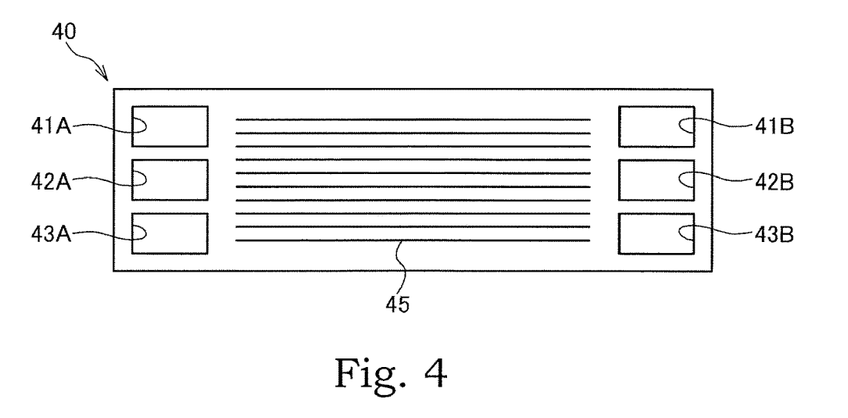
FIG. 4 is a front view of a cathode separator that constitutes the fuel cell.

As illustrated in FIG. 4 and FIG. 5, the cathode separator 40 is a plate-shaped material formed of a conductive material such as metal. The cathode separator 40 has a cathode gas flow passage 44 that flows the cathode gas on a surface at the MEA side, and has a cooling water flow passage 45 that flows the cooling water on an opposite side surface of the MEA side.

As illustrated in FIG. 4, at one end side (a left side in FIG. 4) of the cathode separator 40, in an order from above, an anode gas supply manifold 41A, a cooling water supply manifold 42A, and a cathode gas supply manifold 43A are formed. At the other end side (a right side in FIG. 4) of the cathode separator 40, in an order from above, an anode gas exhaust manifold 41B, a cooling water exhaust manifold 42B, and a cathode gas exhaust manifold 43B are formed.

The cathode gas supplied from the cathode gas supply manifold 43A passes through the cathode gas flow passage 44 to flow out to the cathode gas exhaust manifold 43B. The cooling water supplied from the cooling water supply manifold 42A passes through the cooling water flow passage 45 to flow out to the cooling water exhaust manifold 42B.

When the fuel cell stack 100 is constituted such that the fuel cell 10 having the MEA 20, the anode separator 30, and the cathode separator 40 is stacked, the anode gas supply manifolds 31A, 41A, and 51A are aligned in the stacking direction to function as one anode gas supply passage. At this time, the cooling water supply manifolds 32A, 42A, and 52A function as one cooling water supply passage, and the cathode gas supply manifolds 33A, 43A, and 53A function as one cathode gas supply passage. Similarly, the anode gas exhaust manifolds 31B, 41B, and 51B, the cooling water exhaust manifolds 32B, 42B, and 52B, and the cathode gas exhaust manifolds 33B, 43B, and 53B function as an anode gas exhaust passage, a cooling water exhaust passage, and a cathode gas exhaust passage respectively.

It should be noted that, as illustrated in FIG. 5, in adjacent two fuel cells 10, the respective cooling water flow passages 35, 45 disposed on the anode separator 30 of one fuel cell 10 and the cathode separator 40 of the other fuel cell 10 are arranged to face one another. The cooling water flow passages 35, 45 thus arranged constitute one cooling passage.

The fuel cell 10 is formed such that the anode separator 30 and the cathode separator 40 are bonded to the frame portion 50 with an adhesive 60. In a state where the anode separator 30 and the cathode separator 40 are bonded to the frame portion 50, the anode separator 30 is arranged such that a surface at a side of the anode gas flow passage 34 is adjacent to one side surface of the MEA 20, and the cathode separator 40 is arranged such that a surface at a side of the cathode gas flow passage 44 is adjacent to the other side surface of the MEA 20.

In these separators 30, 40, the adhesive 60 is arranged to surround separator outer edges and peripheral areas of the respective manifolds. The adhesive 60 has not only a function that bonds the respective members, but also a function as a sealing material that seals between the respective members. Accordingly, as the adhesive 60, an olefin-based adhesive, a silicon-based adhesive, or the like having an adhesion function and a seal function is employed. These adhesives are in a gel state before hardening, and in a solid state having elasticity after hardening.

Figure 6A:
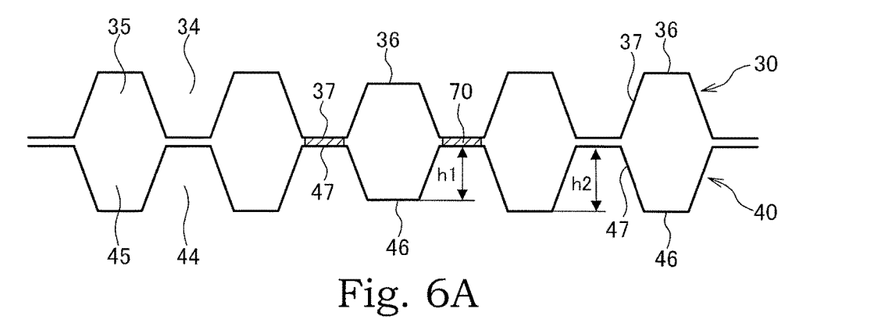
FIG. 6A is a view illustrating a separator assembly such that two separators are welded.
Figure 6B:
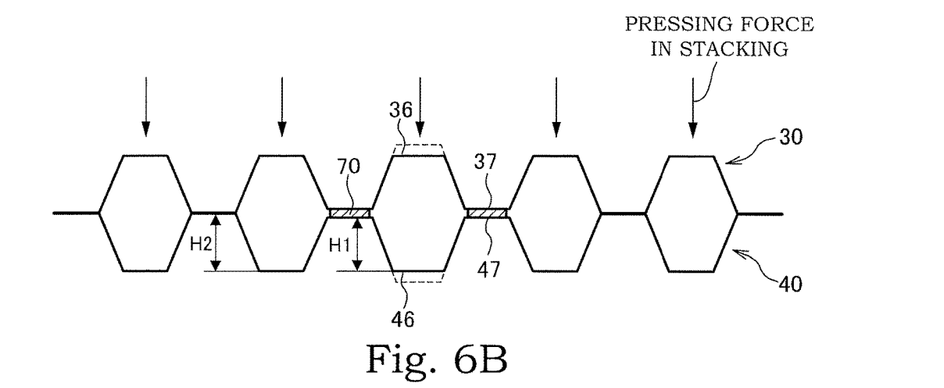
FIG. 6B is a view illustrating the separator assembly in stacking of the fuel cell.
Figure 6C:
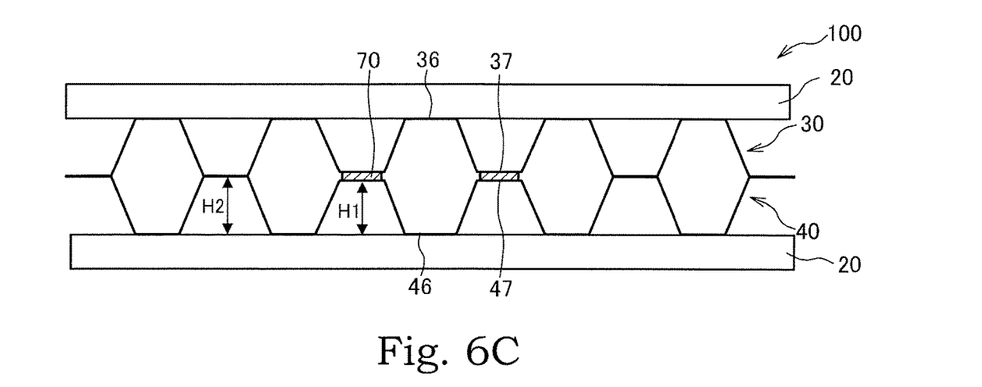
FIG. 6C is a view illustrating a state of the separator assembly in constituting of the fuel cell stack.

The following describes the configurations of the anode separator 30 and the cathode separator 40 in the fuel cell stack 100 according to this embodiment in more detail, with reference to FIG. 6A to FIG. 6C.

In the adjacent two fuel cells 10, as illustrated in FIG. 6A, the anode separator 30 of one fuel cell 10 is joined to the cathode separator 40 of the other fuel cell 10 by welding. The two separators 30, 40 are thus welded and connected to form a separator assembly, thus mutually positioning both separators 30, 40. The separator assembly thus formed and the MEA 20 are alternately built up to stack them, thus constituting the fuel cell stack 100.

The cathode separator 40 is constituted as an uneven-shaped member such that a flat-plate-shaped bottom portion 46 that abuts on the MEA 20, and a rectangular-shaped protrusion 47 that protrudes from the bottom portion 46 in the fuel cell stacking direction are sequentially arranged in a short side direction (a vertical direction in FIG. 4) within a separator surface. The cathode separator 40 has an uneven-shaped structure, thus including a plurality of cathode gas flow passages 44 on one side surface, and including a plurality of cooling water flow passages 45 on the other side surface.

The anode separator 30 is also constituted as an uneven-shaped member such that a flat-plate-shaped bottom portion 36 that abuts on the MEA 20, and a rectangular-shaped protrusion 37 that protrudes from the bottom portion 36 in the fuel cell stacking direction are sequentially arranged in the separator short side direction (a vertical direction in FIG. 3). With such a configuration, a plurality of anode gas flow passages 34 are formed on one side surface of the anode separator 30, and a plurality of cooling water flow passages 35 are formed on the other side surface of the anode separator 30.

The above-described anode separator 30 and cathode separator 40 are welded to be mutually connected, in a state where the protrusion 37 and the protrusion 47 are positioned to be matched up. When the separator assembly is formed, all the protrusions 37, 47 are not selected as welding positions, and several protrusions 37, 47 among the plurality of existing protrusions 37, 47 are selected as the welding positions. In this embodiment, the protrusions 37, 47 in contact with both sides of the center bottom portions 36, 46 are the welding positions.

The welding for forming the separator assembly is performed such that, in a state where the anode separator 30 and the cathode separator 40 are stuck, the protrusions 37, 47 are irradiated with laser from one separator side. This joins both separators 30, 40 via a welding bead 70 (a welded portion).

It should be noted that, in the anode separator 30 and the cathode separator 40, the center bottom portions 36, 46 in contact with the two protrusions 37, 47 that are the welding positions are formed lower than the other bottom portions 36, 46 other than the center. That is, the cathode separator 40 is constituted such that an amount of protrusion h1 of the protrusion 47 on which the welding bead 70 is formed is lower than an amount of protrusion h2 of the protrusion 47 at other than the welding position. The anode separator 30 is similarly constituted such that an amount of protrusion of the protrusion 37 on which the welding bead 70 is formed is lower than an amount of protrusion of the protrusion 37 at other than the welding position. The protrusions 37, 47 at the welding position thus set low function as surface pressure adjustment portions that reduce variation of a surface pressure that acts on the separators 30, 40 in stacking of the fuel cell.

When stacking the fuel cell, to a stacked body formed such that the separator assembly and the MEA 20 are alternately built up, a predetermined pressing force is added in the stacking direction. In the separator assembly illustrated in FIG. 6A, a gap exists between both separators 30, 40 caused by the existence of the welding bead 70. With the pressing force in stacking, the anode separator 30 and the cathode separator 40 will overlap one another such that the protrusion 37 abuts on the protrusion 47 as illustrated in FIG. 6B.

When the amounts of protrusion of all the protrusions 37, 47 are set equal, the center bottom portions 36, 46 protrude in the stacking direction caused by the existence of the welding bead 70, as indicated by the dashed line in FIG. 6B.

However, in this embodiment, the amounts of protrusion of the protrusions 37, 47 at the welding position are constituted lower than the amounts of protrusion of the other protrusions 37, 47. Thus, even when constituting the fuel cell stack 100, a protrusion height H1 of the protrusions 37, 47 at the welding position is lower than a protrusion height H2 of the other protrusions 37, 47. As a result, when constituting the fuel cell stack 100, as illustrated in FIG. 6C, all the bottom portions 36, 46 will be approximately aligned on an identical planar surface. It should be noted that the protrusion height of the protrusions 37, 47 when constituting the fuel cell stack 100 means a distance from the MEA 20 to distal end surfaces of the protrusions 37, 47.

In the fuel cell stack 100, in order to align the bottom portions 36 of the anode separator 30 on the identical planar surface, and to align the bottom portions 46 of the cathode separator 40 on the identical planar surface, the protrusion height H1 of the protrusions 37, 47 at the welding position is preferably set lower than the protrusion height H2 of the protrusions 37, 47 other than the welding position by a height (a thickness) of the welding bead 70.

Figure 7:
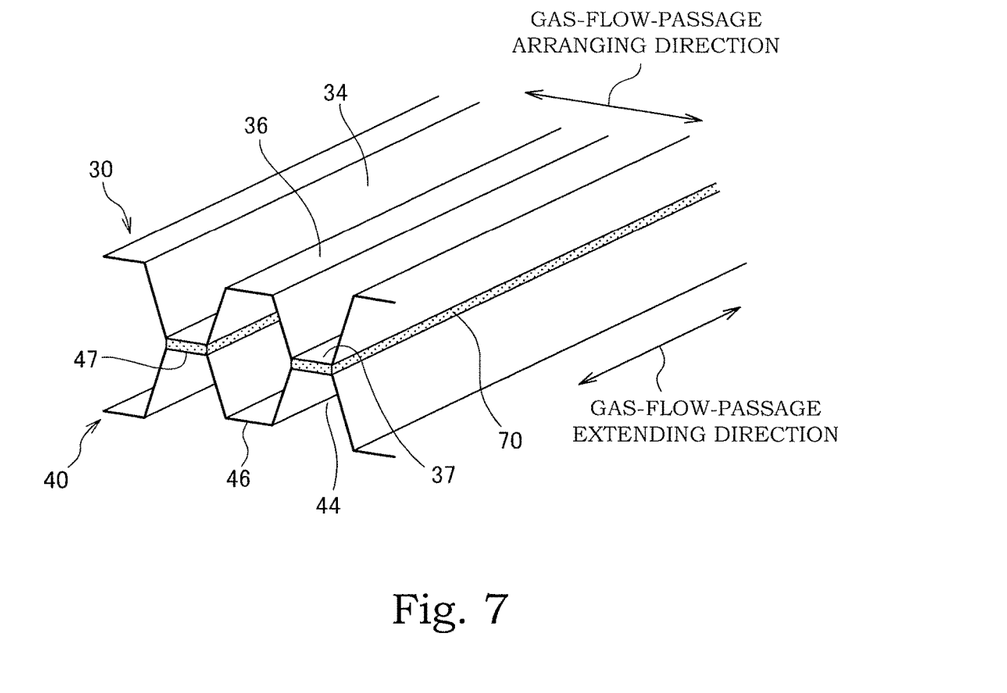
FIG. 7 is a view illustrating an exemplary welding bead formed in welding of the separator.

As described above, the welding bead 70 that joins the separators 30, 40 is, for example, as illustrated in FIG. 7, formed along an extending direction of the gas flow passages 34, 44 (fluid flow passages) between the protrusions 37, 47. Thus, the welding bead 70 is constituted as a line-shaped bead (a line welded portion).

Figure 8:
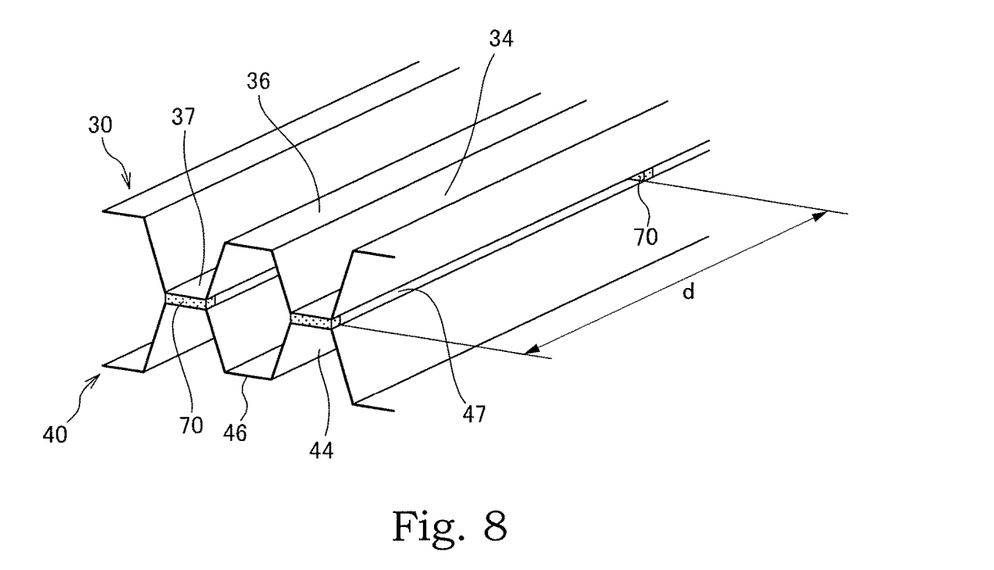
FIG. 8 is a view illustrating an exemplary welding bead formed in welding of the separator.

It should be noted that, as illustrated in FIG. 8, the welding bead 70 may be constituted as a welding bead (a spot welded portion) formed in spots having a predetermined, distance d in the extending direction of the gas flow passages 34, 44 (the fluid flow passages). In this case, a plurality of welding beads 70 are disposed in the gas-flow-passage extending direction.

The predetermined distance d is set to a distance such that the protrusions 37, 47 between the welding beads 70 arranged in the gas-flow-passage extending direction do not bend in the stacking direction by the pressing force that acts on the separators 30, 40 when stacking the fuel cell. For example, the predetermined distance d is preferably set to fulfill the following formula (1).

[Expression 1]

$$d < \left(\frac{384\delta \cdot E \cdot I}{W}\right)^{\frac{1}{4}} \quad (1)$$

δ: Allowable deformation amount determined according to membrane electrode assembly
E: Young's modulus of material of separator
I: Second moment of area determined by shapes of bottom portion and protrusion
W: Surface pressure that acts on separator With the above-described fuel cell stack 100 in the first embodiment, the following effect can be obtained.

In the fuel cell stack 100, at least a pair of protrusions 37, 47 of the anode separator 30 and the cathode separator 40 is the welding position, and the protrusion height (a separator height in the stacking direction) of the protrusions 37, 47 at the welding position is lower than the protrusion height of the protrusions 37, 47 other than the welding position.

With such configurations of the separators 30, 40, as illustrated in FIG. 6C, when constituting the fuel cell stack 100, all the bottom portions 36 of the anode separator 30 will be approximately aligned on the identical planar surface, and all the bottom portions 46 of the cathode separator 40 will be approximately aligned on the identical planar surface. This can reduce the variation of the contact surface pressure of the separators 30, 40 and the MEA 20 to ensure reduction of the contact resistance inside the fuel cell stack 100. Furthermore, the bottom portions 36, 46 of the separators 30, 40 are not strongly pressed to the MEA 20 to ensure reduction of deterioration of the MEA 20.

In the anode separator 30 and the cathode separator 40, the protrusion height of the protrusions 37, 47 at the welding position is set lower than the protrusion height of the other protrusions 37, 47 by the height of the welding bead 70. Such a consideration of the height of the welding bead 70 ensures the reduction of the variation (variability) of the contact surface pressure of the separators 30, 40 and the MEA 20 in the fuel cell stack 100 with more certainty.

The welding bead 70 that connects the anode separator 30 to the cathode separator 40 is constituted as the line-shaped bead formed along the extending direction of the gas flow passages 34, 44 between the protrusions 37, 47. Such a line shape of the welding bead 70 can join the anode separator 30 to the cathode separator 40 with more certainty.

It should be noted that the welding bead 70 that connects the anode separator 30 to the cathode separator 40 may be constituted as a spot welding bead formed having the predetermined distance d in the extending direction of the gas flow passages 34, 44. In such welding, the anode separator 30 and the cathode separator 40 are joined at minimal welding positions, thus ensuring reduction of welding work hours. The predetermined distance d is set to the distance such that the protrusions 37, 47 between the welding beads 70 do not bend in the stacking direction by the pressing force that acts on the separators 30, 40 when stacking of the fuel cell, thus ensuring reduction of deformation of the separators 30, 40 in stacking of the fuel cell.

Second Embodiment

Figure 9A:
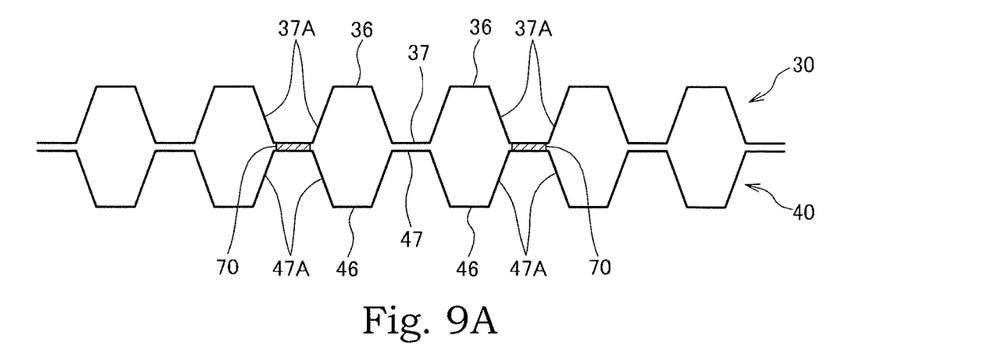
FIG. 9A is a view illustrating a separator assembly such that separators are welded according to a second embodiment of the present invention.
Figure 9B:
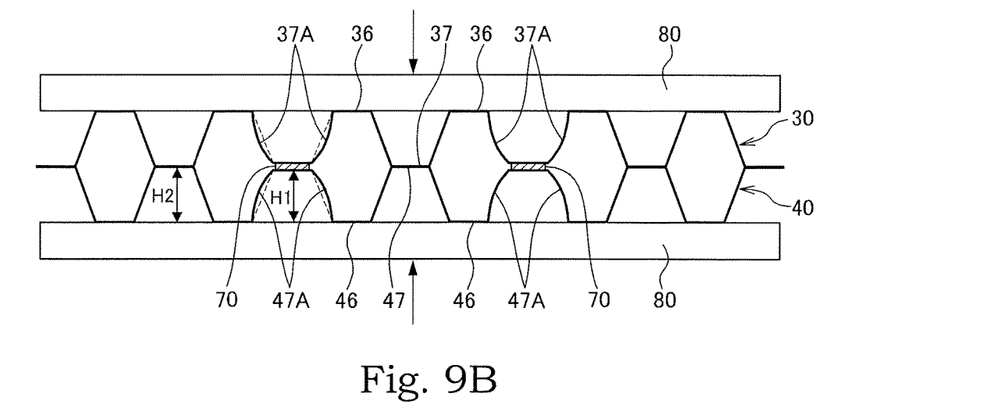
FIG. 9B is a view illustrating a state of the separator assembly in advance compression forming.
Figure 9C:
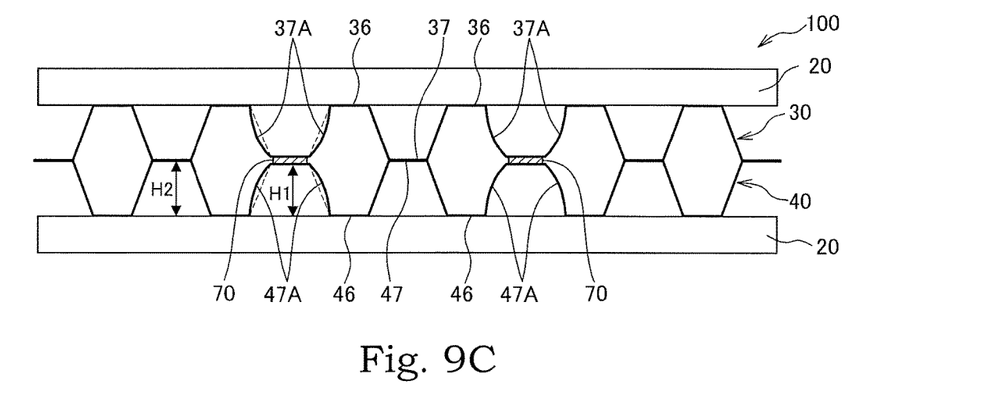
FIG. 9C is a view illustrating a state of the separator assembly in constituting of a fuel cell stack.

The following describes a fuel cell stack 100 according to a second embodiment of the present invention with reference to FIG. 9A to FIG. 9C. A technical idea of this embodiment can be combined with a technical idea of the first embodiment as necessary. The following embodiments use identical reference numerals to components that have functions identical to those of the first embodiment, and therefore such elements may not be further elaborated here.

In the second embodiment, in the anode separator 30 and the cathode separator 40 before the constitution of the fuel cell stack 100, all the protrusions 37, 47 are set to have an identical amount of protrusion. When these separators 30, 40 are connected by welding, as illustrated in FIG. 9A, a separator assembly having a gap by the height of the welding bead 70 between the protrusions 37, 47 other than the welding position is formed.

Observing the cathode separator 40, the welding beads 70 are formed on the protrusions 47 different in an arranging direction of the gas flow passage 44. As illustrated in FIG. 9A, in this embodiment, two protrusions 47 positioned next to the center protrusion 47 are set as the welding positions. Thus, between the protrusions 47, 47 that will be the welding positions, at least one or more (one in this embodiment) protrusion 47 on which the welding is not performed in the arranging direction of the gas flow passage 44 will exist. It should be noted that the same applies to the anode separator 30.

When the fuel cell stacking is performed using directly thus constituted separator assembly, the bottom portions 36, 46 positioned inside the welding positions protrude in the stacking direction caused by the existence of the welding bead 70 to vary the contact surface pressure of the separators 30, 40 and the MEA 20.

Therefore, in the anode separator 30 and the cathode separator 40 in this embodiment, the protrusions 37, 47 at the welding position have deformed portions 37A, 47A elastically deformed by presswork. The deformed portions 37A, 47A are sidewall parts that connect the bottom portions 36, 46 to the end surfaces of the protrusions 37, 47. These deformed portions 37A, 47A function as the surface pressure adjustment portions.

In this embodiment, in a step before the stacking of the separator assembly and the MEA 20, an advance compression forming (the presswork) is performed on the separator assembly. This advance compression forming will be described with reference to FIG. 9B.

As illustrated in FIG. 9B, the advance compression forming is performed such that flat plate molds 80 are abutted on the end surface of the protrusion 37 of the anode separator 30 and the end surface of the protrusion 47 of the cathode separator 40 to compress these separators 30, 40 in the stacking direction. In the advance compression forming, a compressive load that acts on the separators 30, 40 is set higher than a stacking load (the pressing force) that acts on the separators 30, 40 and the like in stacking of the fuel cell. The compressive load in the advance compression forming is determined considering a separator shape, a welding bead shape, and the like.

When the advance compression forming is thus performed, stress concentrates on the deformed portions 37A, 47A of the protrusions 37, 47 at the welding position, and these deformed portions 37A, 47A elastically deform to be depressed inside. By thus deforming the deformed portions 37A, 47A, in the separator assembly, the protrusion 37 of the anode separator abuts on the protrusion 47 of the cathode separator 40 where the welding bead 70 does not exist. As a result, in the cathode separator 40, the protrusion height H1 of the protrusion 47 on which the welding bead 70 is formed becomes lower than the protrusion height H2 of the protrusion 47 at other than the welding position. In the anode separator 30, similarly, the protrusion height of the protrusion 37 on which the welding bead 70 is formed becomes lower than the protrusion height of the protrusion 37 at other than the welding position.

In the separator assembly thus shaped by the advance compression forming, in constituting of the fuel cell stack 100, as illustrated in FIG. 9C, the protrusion height H1 of the protrusions 37, 47 at the welding position is lower than the protrusion height H2 of the other protrusions 37, 47. Thus, all the bottom portions 36, 46 will be approximately aligned on the identical planar surface. Accordingly, when the fuel cell stack 100 is constituted using the separator assembly shaped by the advance compression forming, the reduction of the variation of the contact surface pressure of the separators 30, 40 and the MEA 20 is ensured.

With the above-described the fuel cell stack 100 in the second embodiment, the following effect can be obtained.

In the fuel cell stack 100, in the anode separator 30 and the cathode separator 40, the protrusion height (the separator height in the stacking direction) of the protrusions 37, 47 at the welding position is lower than the protrusion height of the protrusions 37, 47 at other than the welding position. The sidewall parts of the protrusions 37, 47 at the welding positions of the separators 30, 40 are constituted as the deformed portions 37A, 47A configured to elastically deform. These deformed portions 37A, 47A are preliminarily deformed to set the protrusion height of the protrusions 37, 47 at the welding position lower than the protrusion height of the protrusions 37, 47 at other than the welded portion.

With such constitution of the fuel cell stack 100 using the separators 30, 40 shaped by the advance compression forming or the like, as illustrated in FIG. 9C, in constituting of the fuel cell stack 100, all the bottom portions 36 of the anode separator 30 will be approximately aligned on the identical planar surface, and all the bottom portions 46 of the cathode separator 40 will be approximately aligned on the identical planar surface. This can reduce the variation of the contact surface pressure of the separators 30, 40 and the MEA 20 to ensure reduction of the contact resistance inside the fuel cell stack 100. Furthermore, the bottom portions 36, 46 of the separators 30, 40 are not strongly pressed to the MEA 20 to ensure reduction of deterioration of the MEA 20.

In the fuel cell stack 100, between the protrusions 37, 47 and the protrusions 37, 47 as the welding positions, at least one or more protrusions 37, 47 that are not welded exist in the arranging direction of the gas flow passages 34, 44. Thus, welding position distances are appropriately separated from one another in the arranging direction of the gas flow passages 34, 44 to ensure enhancement of bending moment at the deformed portions 37A, 47A in the advance compression forming. Accordingly, without so increasing the compressive load in the advance compression forming, the deformed portions 37A, 47A of the protrusions 37, 47 are ensured to elastically deform, thus preventing damage of the separators 30, 40 in the advance compression forming.

The mold used in the advance compression forming has been described as the flat plate mold 80, but may be a mold other than the flat plate mold. For example, the mold may be a mold shaped into an uneven shape corresponding to the separator shape to be configured to deform the deformed portions 37A, 47A of the protrusions 37, 47 in processing.

Modification of First and Second Embodiments

A fuel cell stack 100 according to a modification of the first and second embodiments will be described with reference to FIG. 10.

The fuel cell stack 100 according to this modification is a fuel cell stack constituted using the separator assembly described in the first or second embodiment, and has a feature in an arrangement of the welding bead 70 that joins the separators 30, 40.

The fuel cell stack 100 is constituted as a stacked body formed such that a plurality of fuel cells 10 are stacked. In two separators 30, 40 arranged across the MEA 20 of one certain fuel cell 10, the welding beads 70 at a side of the anode separator 30 and the welding beads 70 at a side of the cathode separator 40 are formed shifted in the arranging direction of the gas flow passages 34, 44 as illustrated in FIG. 10.

When the welding beads 70 are formed in spots as illustrated in FIG. 8, the welding beads 70 of the anode separator 30 and the welding beads 70 of the cathode separator 40 may be shifted not only in the arranging direction of the gas flow passages 34, 44, but also in the extending direction of the gas flow passages 34, 44.

With the above-described fuel cell stack 100 according to the modification, the following effect can be obtained.

In the fuel cell stack 100, the anode separator 30 and the cathode separator 40 are arranged across the MEA 20 of the fuel cell 10. In the two separators 30, 40 thus arranged, the welding beads 70 at the anode separator 30 side and the welding beads 70 at the cathode separator 40 side are arranged shifted at least in one direction of the extending direction of the gas flow passages 34, 44 and the arranging direction of the gas flow passages 34, 44.

Formation positions of the welding beads 70 are thus dispersed to ensure reduction of overlapping in the stacking direction of the welding beads 70 (the welding positions) in the stacked fuel cell 10. As a result, in constituting of the fuel cell stack 100, the variation of the contact surface pressure of the separators 30, 40 and the MEA 20 can be more effectively reduced.

Figure 10:
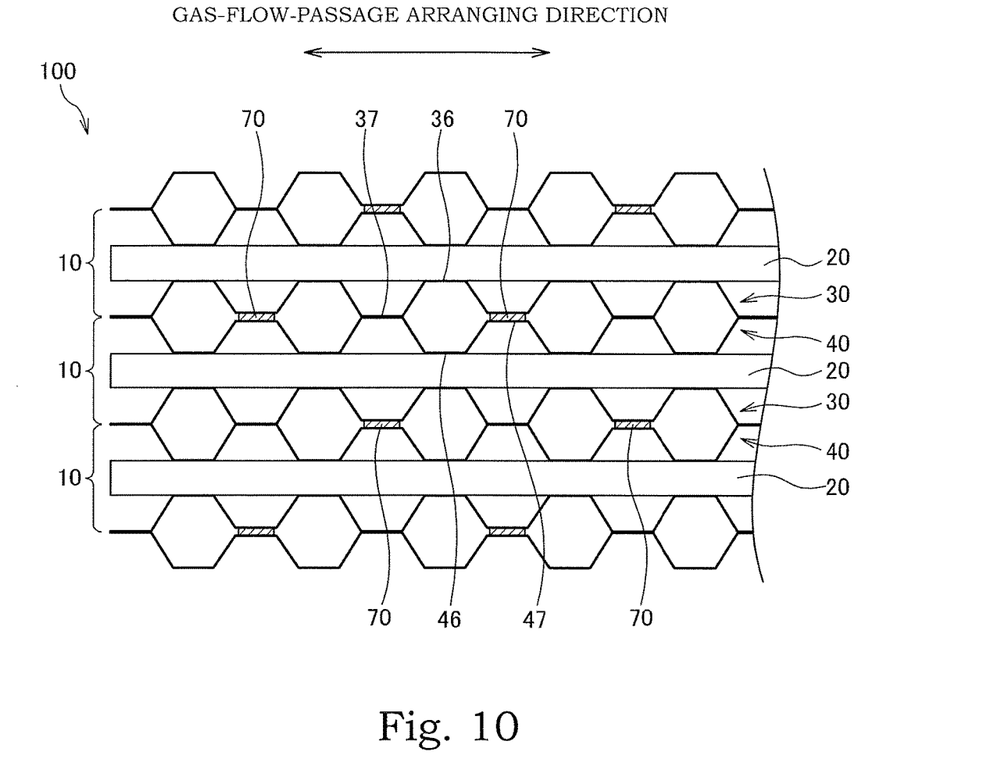
FIG. 10 is a view illustrating a cross-sectional surface in a stacking direction of a fuel cell stack according to one modification of the first and second embodiments.
Figure 11:
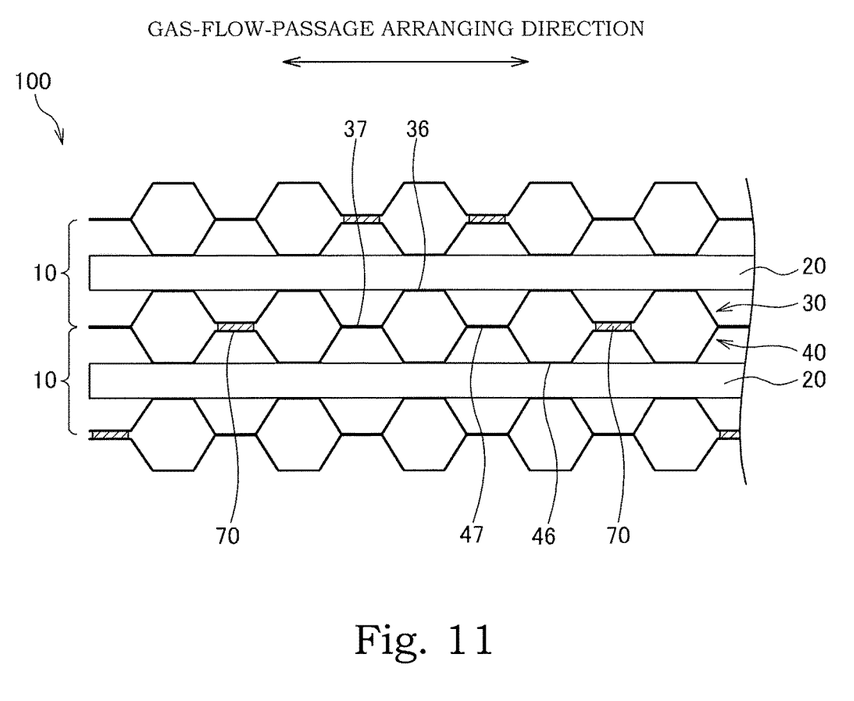
FIG. 11 is a view illustrating a cross-sectional surface in a stacking direction of a fuel cell stack according to another modification of the first and second embodiments.

In the fuel cell stack 100 illustrated in FIG. 10, when viewed from the stacking direction, all the welding beads 70 are not formed at an identical position, but several welding beads 70 are formed to overlap. Then, as illustrated in FIG. 11, the fuel cell stack 100 may be constituted such that, when viewed from the stacking direction, all the welding beads 70 are formed at different positions.

Thus, when viewed from the stacking direction, all the formation positions of the welding beads 70 do not overlap to more ensure the reduction of the variation of the contact surface pressure of the separators 30, 40 and the MEA 20.

The embodiment of the present invention described above is merely illustration of a part of application example of the present invention and not of the nature to limit the technical scope of the present invention to the specific constructions of the above embodiment.

In the second embodiment, the advance compression forming is performed on all the surfaces of the anode separator 30 and the cathode separator 40 to elastically deform the deformed portions 37A, 47A of the protrusions 37, 47. However, the advance compression forming may be performed on only a region where the variation of the contact surface pressure is likely to become a problem in the anode separator 30 and the cathode separator 40.

For example, in the fuel cell stack 100, an anode gas pressure is high at a side of the anode gas exhaust manifold 31B, compared with a side of the anode gas supply manifold 31A. Thus, in driving of a fuel cell system, the contact pressure that acts on the anode separator 30 tends to increase at a position near the anode gas exhaust manifold 31B. Accordingly, in the anode separator 30, the advance compression forming is performed on only the position near the anode gas exhaust manifold 31B, and the deformed portion 37A of the protrusion 37 in a region on which this compression forming is performed is elastically deformed. Thus, the variation of the contact surface pressure of the anode separator 30 and the MEA 20 can be reduced.

It should be noted that, also for the cathode separator 40, from an identical aspect, the advance compression forming is preferably performed on a position near the cathode gas exhaust manifold 43B. Thus, the deformed portion 47A of the protrusion 47 in the region on which the advance compression forming is performed is elastically deformed to ensure the reduction of the variation of the contact surface pressure of the cathode separator 40 and the MEA 20.

Figure 12:
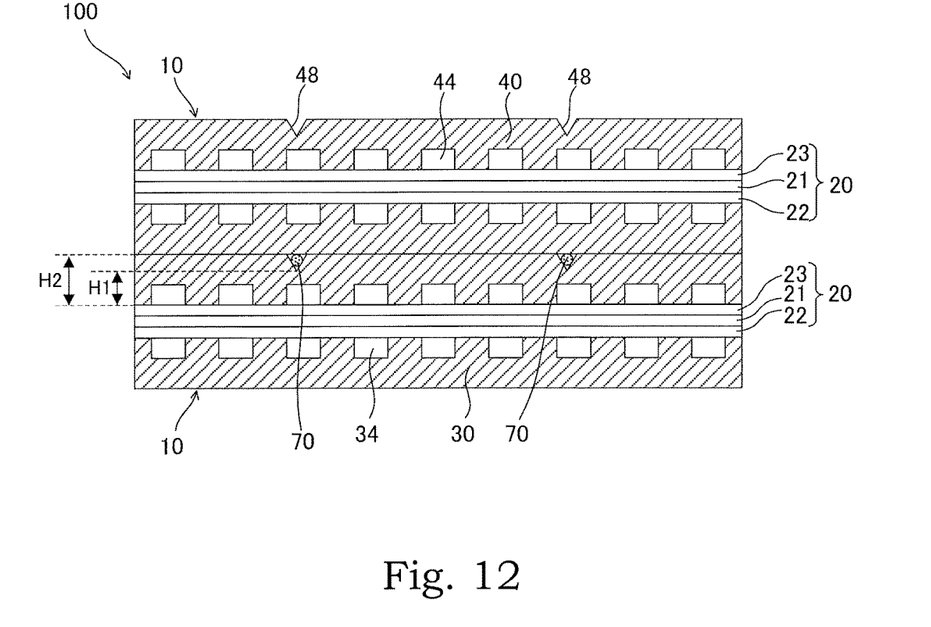
FIG. 12 is an explanatory view of another modification in a separator structure of a fuel cell stack.

The following describes another modification in the separator structure of the fuel cell stack 100 with reference to FIG. 12.

In the fuel cell stack 100 according to this modification illustrated in FIG. 12, the anode separator 30 and the cathode separator 40 are constituted as flat-plate-shaped materials having grooves as the gas flow passages 34, 44. A surface that abuts on the cathode separator 40 of the anode separator 30 is formed as a flat surface. A surface that abuts on the anode separator 30 of the cathode separator 40 is formed as a flat surface. Especially, on this flat surface of the cathode separator 40, a depressed portion 48 (a welded portion) is formed. Inside the depressed portion 48, the welding bead 70 for joining the separators 30, 40 is disposed.

By thus disposing the depressed portion 48, in the cathode separator 40, the separator height H1 in the stacking direction at the welding position is lower than the separator height H2 other than the welding position. Thus, even if the adjacent cathode separator 40 and anode separator 30 are joined by the welding bead 70 formed inside the depressed portion 48, without forming a gap between both separators 30, 40, the flat surfaces of these separators 30, 40 can be abutted on one another. As a result, the variation of the contact surface pressure of the separators 30, 40 and the MEA 20 can be reduced to reduce the contact resistance inside the fuel cell stack 100. Furthermore, the bottom portions 36, 46 of the separators 30, 40 are not strongly pressed to the MEA 20 to ensure the reduction of the deterioration of the MEA 20.

In the fuel cell stack 100 illustrated in FIG. 12, the depressed portion 48 is formed on the flat surface of the cathode separator 40. However, a depressed portion may be formed on the flat surface of the anode separator 30. Depressed portions may be formed on both flat surfaces of the separators 30, 40.

The invention claimed is:

1. A fuel cell stack comprising:
   a plurality of fuel cells, each of the fuel cells including a membrane electrode assembly sandwiched between a pair of separators that have flow passages through which gas to be supplied to the membrane electrode assembly flows, the membrane electrode assembly comprising an electrolyte membrane sandwiched between a pair of electrodes, the pair of separators being arranged across the membrane electrode assembly such that the pair of separators contact the membrane electrode assembly on opposing sides thereof, and each separator of the pair of separators comprising bottom portions in contact with the membrane electrode assembly and protrusions that protrude from the bottom portions in a stacking direction of the fuel cell; and
   at least one welded portion where separators adjacent to one another in the stacking direction are welded, the at least one welded portion being formed between at least one pair of protrusions adjacent to one another in the stacking direction,
   wherein a height, in the stacking direction, of a protrusion of a given separator on which a welded portion is formed is less than a height, in the stacking direction, of a protrusion of the given separator on which a welded portion is not formed.

2. The fuel cell stack according to claim 1, wherein:
   the bottom portions and the protrusions are sequentially arranged in one direction on a surface of each separator.

3. The fuel cell stack according to claim 2, wherein:
   the protrusion on which the welded portion is formed has a sidewall part comprising a deformed portion configured to elastically deform, and
   the deformed portion is preliminarily elastically deformed such that the height of the protrusion on which the welded portion is formed is less than the height of the protrusion on which the welded portion is not formed.

4. The fuel cell stack according to claim 2, wherein a difference between the height of the protrusion on which the welded portion is formed and the height of the protrusion on which the welded portion is not formed is equal to a height of the welded portion.

5. The fuel cell stack according to claim 2, wherein the welded portion includes a line welded portion formed along an extending direction of the flow.

6. The fuel cell stack according to claim 2, wherein the at least one welded portion comprises a plurality of spot welded portions formed at predetermined distance intervals in an extending direction of the flow passages.

7. The fuel cell stack according to claim 2, wherein:
   the at least one welded portion comprises a plurality of welded portions formed on different protrusions in an arranging direction of the flow passages, and
   at least one protrusion on which a welded portion is not formed is provided between protrusions on which the welded portions are formed in the arranging direction of the flow passages.

8. The fuel cell stack according to claim 1, wherein the pair of separators comprises a first separator and a second separator each having a welded portion formed thereon, and
   the welded portion formed on the first separator and the welded portion formed on the second separator are offset at least in one direction of an extending direction of the flow passages or an arranging direction of the flow passages.

9. The fuel cell stack according to claim 1, wherein the at least one welded portion comprises a plurality of welded portions, and
   all the welded portions included in the fuel cell stack are positioned at different positions when viewed from the stacking direction.

10. The fuel cell stack according to claim 1, wherein the at least one welded portion comprises a plurality of welded portions, and
    all the welded portions included in the fuel cell stack are positioned offset from one another when viewed from the stacking direction.

* * * * *